(12) United States Patent
Kim et al.

(10) Patent No.: US 12,487,702 B2
(45) Date of Patent: Dec. 2, 2025

(54) DISPLAY DEVICE SETTING TOUCH AREAS CORRESPONDING TO EACH OF DISPLAY AREAS

(71) Applicant: SAMSUNG DISPLAY CO., LTD., Yongin-si (KR)

(72) Inventors: Soo Won Kim, Yongin-si (KR); Hyun Jae Lee, Yongin-si (KR); Young Sik Kim, Yongin-si (KR); Yun Ho Kim, Yongin-si (KR); Young Seok Yoo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/752,952

(22) Filed: Jun. 25, 2024

(65) Prior Publication Data
US 2025/0130669 A1    Apr. 24, 2025

(30) Foreign Application Priority Data
Oct. 18, 2023  (KR) .......................... 10-2023-0139819

(51) Int. Cl.
G06F 3/041     (2006.01)
G06F 3/044     (2006.01)

(52) U.S. Cl.
CPC ...... *G06F 3/041661* (2019.05); *G06F 3/0412* (2013.01); *G06F 3/0446* (2019.05)

(58) Field of Classification Search
CPC . G06F 3/041661; G06F 3/0412; G06F 3/0446
See application file for complete search history.

(56) References Cited

U.S. PATENT DOCUMENTS

| | | | |
|---|---|---|---|
| 9,619,073 B2 | 4/2017 | Shin et al. | |
| 12,242,683 B2* | 3/2025 | Takeuchi | G06F 3/04182 |
| 2015/0002441 A1* | 1/2015 | Brunet | G06F 3/0416 345/173 |
| 2022/0137773 A1* | 5/2022 | Lim | G06F 3/0416 345/173 |
| 2023/0072385 A1 | 3/2023 | Kim et al. | |

FOREIGN PATENT DOCUMENTS

| | | |
|---|---|---|
| KR | 10-1491203 | 2/2015 |
| KR | 10-2023-0037116 | 3/2023 |

* cited by examiner

*Primary Examiner* — Peter D Mcloone
(74) *Attorney, Agent, or Firm* — F. CHAU & ASSOCIATES, LLC

(57) ABSTRACT

A display device includes: a display driver for displaying an image on a display panel of the display device, and generating a mode control signal indicating whether the display panel includes at least one of a first display area and a second display area; and a sensor driver for setting a touch sensitivity of a first touch area of the display device corresponding to the first display area and a touch sensitivity of a second touch area of the display device correspond to the second display area, based on the mode control signal.

17 Claims, 13 Drawing Sheets

DISPLAY DEVICE SETTING TOUCH AREAS CORRESPONDING TO EACH OF DISPLAY AREAS

CROSS-REFERENCE TO RELATED APPLICATION

This patent application claims priority under 35 U.S.C. § 119 (a) to Korean patent application No. 10-2023-0139819 filed on Oct. 18, 2023 in the Korean Intellectual Property Office, the disclosure of which is incorporated by reference in its entirety herein.

TECHNICAL FIELD

The present disclosure is directed to a display device with a touch sensor.

DISCUSSION OF RELATED ART

A display device is used as a connection medium between a user and information. Examples of the display device includes a liquid crystal display device and an organic light emitting display device.

A display device may include a display panel for displaying an image and a touch sensor for sensing a position of a touch. The display panel displays a predetermined image, corresponding to a driving signal supplied from a display driver. The touch sensor senses an external input, corresponding to a touch signal supplied from a sensor driver.

Such display devices may display images with various content. For example, the display devices may display various types of images such as still images, web pages, and images for movies or electronic games. In the case where a still image is displayed on a display device, frequent frame conversion is not required. On the other hand, in the case where images for movies or electronic games are displayed on a display device, frequent frame conversion is needed.

However, when frequent frame conversion is needed, a large amount of power may be consumed. Further, the display device may need to be refreshed using various refresh rates. However, due to the use of these various refresh rates, visibility may decrease.

SUMMARY

At least one embodiment of the disclosure provides a display device that sets touch areas corresponding to each of a corresponding display areas, based on a signal including information on the display areas.

In accordance with an aspect of the present disclosure, there is provided a display device including: a display driver and a sensor driver. The display driver is configured to display an image on a display panel, and generate a mode control signal indicating whether the display panel includes at least one of a first display area and a second display area. The sensor driver is configured to set a touch sensitivity of a first touch area of the display device corresponding to the first display area and a touch sensitivity of a second touch area of the display device to be different from each other, based on the mode control signal.

The display driver may output the mode control signal to the sensor driver for each cycle of a vertical synchronization signal.

A viewing angle of the first display area may be smaller than a viewing angle of the second display area.

When the display panel includes the first display area, the mode control signal may include at least one pulse.

The sensor driver may include: a first logic circuit, a second logic circuit and a touch controller. The first logic circuit is configured to output an enable signal when a voltage level of the mode control signal is changed. The second logic circuit is configured to determine the first display area, based on the mode control signal in response to receipt of the enable signal, and generate a first touch control signal indicating the first display area. The touch controller is configured to determine the first touch area, based on the first touch control signal, and supply a first driving signal to the first touch area.

The second logic circuit may determine a range of the first display area according to a width of a first pulse of the mode control signal.

The second logic circuit may determine a range of the first display area according to a number of pulses included in the mode control signal.

The mode determiner may output a second touch control signal when the voltage level of the mode control signal is maintained. The touch controller may supply a second driving signal to a sensor when the touch controller receives the second touch control signal.

A number of pulses included in the first driving signal may be greater than a number of pulses included in the second driving signal.

A slew rate of the first driving signal may be higher than a slew rate of the second driving signal.

The touch sensitivity of the first touch area may be higher than the touch sensitivity of the second touch area.

In accordance with aspect of the present disclosure, there is provided a display device including: a display driver and a sensor driver. The display driver is configured to display an image on a display panel, generate a mode control signal indicating whether the display panel includes at least one of a first display area and a second display area, and generate an encoding signal by encoding a vertical synchronization signal and the mode control signal. The sensor driver is configured to set a touch sensitivity of a first touch area of the display device corresponding to the first display area and a touch sensitivity of a second touch area of the display device to be different from each other, based on the encoding signal.

A viewing angle of the first display area may be smaller than a viewing angle of the second display area.

The sensor driver may determine a range of the first display area according to a width of a first pulse of the encoding signal.

The display driver may include: a signal generator configured to generate the mode control signal including a number of pulses, which corresponds to a range of the first display area, when the display panel includes the first display area; and an encoder configured to generate the encoding signal by encoding the mode control signal and the vertical synchronization signal.

The display driver may include: a signal generator configured to output, as the mode control signal, a pulse signal having a first duration during a first period when the display panel includes the first display area, and output a pulse signal having a second duration different from the first duration during a second period after the first period; and an encoder configured to generate the encoding signal by encoding the mode control signal and the vertical synchronization signal.

The signal generator may control pulses included in the mode control signal during the second period according to the range of the first display area.

In accordance with an aspect of the present disclosure, there is provided a display device including: a display driver and a sensor driver. The display driver is configured to display an image on a display panel of the display device, generate a mode control signal indicate whether the display panel includes at least one of a first display area and a second display area, and generate an encoding signal by encoding a horizontal synchronization signal and the mode control signal. The sensor driver is configured to set a touch sensitivity of a first touch area of the display device corresponding to the first display area and a touch sensitivity of a second touch area of the display device corresponding to the second display area to be different from each other.

A viewing angle of the first display area may be smaller than a viewing angle of the second display area.

The display driver may include: a signal generator configured to output a pulse signal as the mode control signal during a control period in a period of a frame when the display panel includes the first display area; and an encoder configured to generate the encoding signal by encoding the mode control signal and the horizontal synchronization signal.

DETAILED DESCRIPTION

Figure 1:
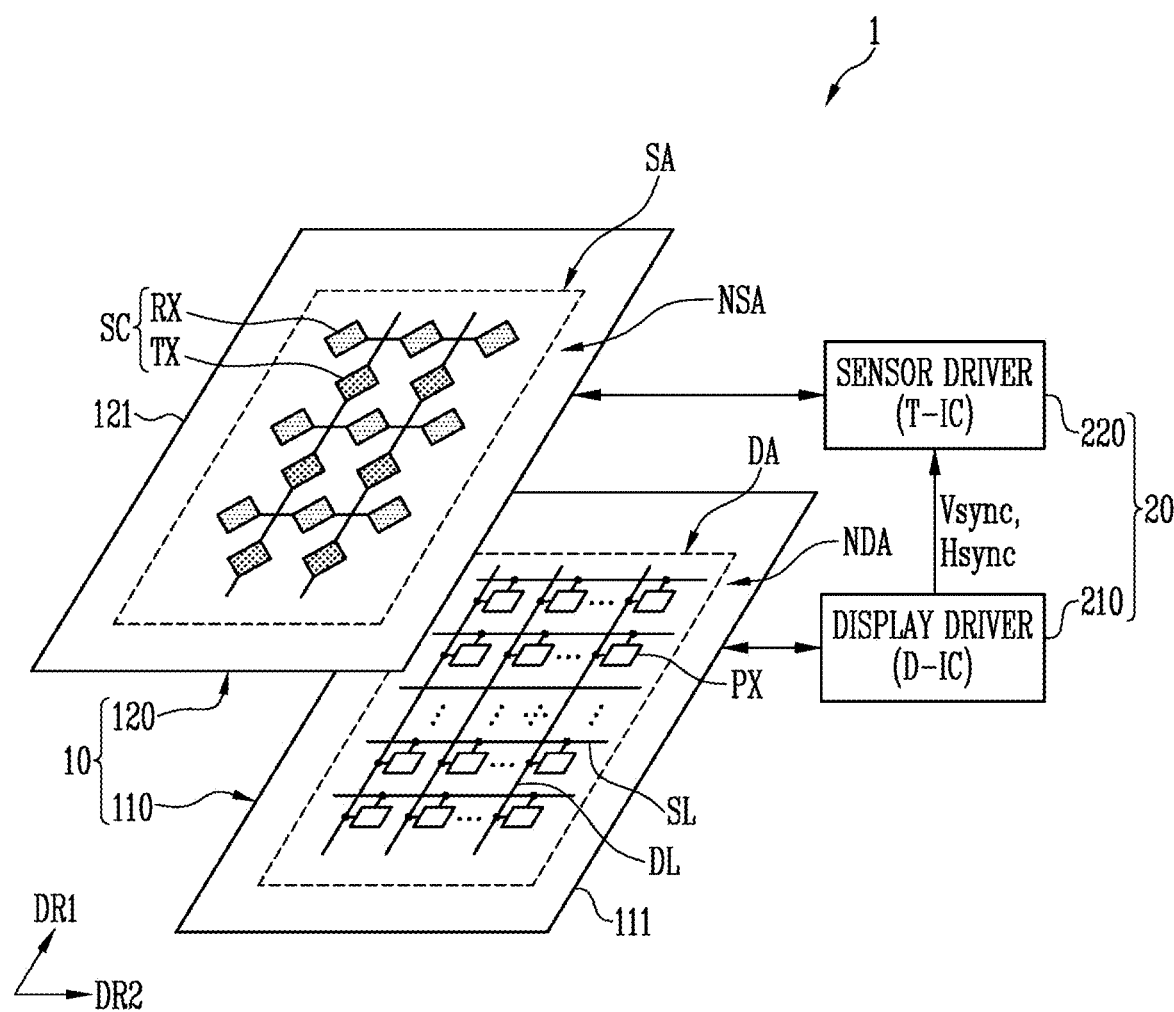
FIG. 1 is a diagram illustrating a display device in accordance with an embodiment of the present disclosure.

Hereinafter, exemplary embodiments are described in detail with reference to the accompanying drawings so that those skilled in the art may practice the present disclosure. The present disclosure may be implemented in various different forms and is not limited to the exemplary embodiments described in the present specification. Like parts are designated with like reference numerals throughout the specification.

In addition, terms including "unit," "module," and the like, which are used herein, refer to units which perform at least one function or operation, and the unit, the module, and the like may be implemented as hardware, software, or a combination of hardware and software.

FIG. 1 is a diagram illustrating a display device in accordance with an embodiment of the present disclosure.

Referring to FIG. 1, the display device 1 may include a panel 10 and a driving circuit 20 for driving the panel 10.

The panel 10 may include a display unit 110 (e.g., a display panel) for displaying an image and a sensor unit 120 (e.g., a sensor device) for sensing a touch, pressure, a fingerprint, hovering, biometric information (or biometric characteristic), or the like. For example, the panel 10 may include pixels PX and sensors SC. One or more of the sensors SC may overlap one or more of the pixels PX. In an embodiment, the sensors SC may include first sensors TX (or driving electrodes) and second sensors RX (or sensing electrodes). In another embodiment (e.g., a self-capacitance mode), the sensors SC may be configured with a single type of sensors without distinguishing the first sensors TX and the second sensors RX from each other.

The driving circuit 20 may include a display driver 210 D-IC for driving the display unit 110 and a sensor driver 220 T-IC for driving the sensor unit 120. The display driver 210 D-IC and the sensor driver 220 T-IC may each be integrated circuits. For example, the pixels PX may display an image by using a display frame period as a unit. For example, the pixels may display the image each display frame period. For example, the sensors SC may sense an input of a user by using a sensing frame period as a unit. For example, the sensors SC may sense the input each sensing frame period. The sensing frame period and the display frame period may be independent from each other or be different from each other. The sensing frame period and the display frame period may be synchronized with each other or be unsynchronized.

In accordance with an embodiment, after the display unit 110 and the sensor unit 120 are manufactured separately from each other, the display unit 110 and the sensor unit 120 may be disposed and/or coupled to overlap with each other in at least one area. Alternatively, in another embodiment, the display unit 110 and the sensor unit 120 may be integrally manufactured. For example, the sensor unit 120 may be formed directly on at least one substrate (e.g., an upper substrate and/or a lower substrate of a display panel, or a thin film encapsulation layer) which constitutes the display unit 110, or another insulating layer or one of various types of functional layers (e.g., an optical layer or a protective layer).

Although FIG. 1 illustrates the sensor unit 120 being disposed on a front surface (e.g., an upper surface on which an image is displayed) of the display unit 110, the position of the sensor unit 120 is not limited thereto. For example, in another embodiment, the sensor unit 120 may be disposed on a rear surface or both surfaces of the display unit 110. In still another embodiment, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA in which an image is displayed and a non-display area NDA at the periphery of the display area DA. In accordance with an embodiment, the display area DA may be disposed in a central area of the display unit 110, and the non-display area NDA is disposed in an edge area of the display unit 110 to surround the display area DA.

The display unit 110 may include at least one of a first display area and a second display area. In an embodiment, a viewing angle of the first display area is smaller than a viewing angle of the second display area. For example, the user looking at the first display area at a side of the display device 1 cannot view any image output in the first display area. For example, the user looking at the second display area at a side of the display device 1 can view an image output in the second display area. For example, images may appear blurry when the user is looking at the first display area at a side of the display device 1 but clear when the user is looking at the second display area at a side of the display device 1.

In an embodiment, an area except the first display area in the display unit 110 may be the second display area. For example, when an upper half of the display unit 110 is the first display area, a lower half of the display unit 110 may be the second display area. In an embodiment, a right half of the display unit 110 is the first display area and a left half of the display unit 110 is the second display area. In an embodiment, the whole of the display unit 110 is the first display area and the display unit 110 does not include the second display area. In an embodiment, the whole of the display unit 110 is the second display area and the display unit 110 does not include the first display area. However, the present disclosure is not limited thereto, and the first display area and the second display area may be variably set according to settings of the user.

The display substrate 111 may be a rigid substrate or a flexible substrate, but the material or property of the display substrate 111 is not particularly limited. For example, the display substrate 111 may be a rigid substrate made of glass or tempered glass, or a flexible substrate configured with a thin film made of plastic or metal.

Scan lines SL and data lines DL, and the pixels PX connected to the scan lines SL and the data lines DL are disposed in the display area DA. Pixels PX are selected by a scan signal having a turn-on level, which is supplied from the scan lines SL, to be supplied with a data signal from the data lines DL, and emit light with a luminance corresponding to the data signal. Accordingly, an image corresponding to the data signal is displayed in the display area DA. In the present disclosure, the structure, driving method, and the like of the pixels PX are not particularly limited. For example, each of the pixels PX may be implemented as a pixel having various structures and/or various driving methods, which are currently known in the art.

Various types of lines and/or a built-in circuit, connected to the pixels PX of the display area DA, may be disposed in the non-display area NDA. In an example, a plurality of lines for supplying various power sources and various control signals to the display area DA may be disposed in the non-display area NDA. In addition, a scan driver and the like may be further disposed in the non-display area NDA.

In the present disclosure, the kind of the display unit 110 is not particularly limited. For example, the display unit 110 may be implemented as a self-luminous display panel such as an organic light emitting display panel. However, when the display unit 110 is implemented as a self-luminescent display panel, each of the pixels PX is not limited to those that include only an organic light emitting element. For example, the light emitting element of each of the pixels PX may be configured as an organic light emitting diode, an inorganic light emitting diode, a quantum dot/well light emitting diode, or the like. A plurality of light emitting elements may be provided in each of the pixels PX. The plurality of light emitting elements may be connected in series, parallel, series/parallel, or the like. Alternatively, the display unit 110 may be implemented as a non-light emitting display panel such as a liquid crystal display panel. When the display unit 110 is implemented as a non-light emitting display panel, the display device 1 may additionally include a light source such as a back-light unit (e.g., a backlight).

The sensor unit 120 may include a sensor substrate 121 and a plurality of sensors SC disposed on the sensor substrate 121. The sensors SC may be disposed in a sensing area SA on the sensor substrate 121.

The sensor substrate 121 may include the sensing area SA capable of sensing a touch input or the like and a peripheral area NSA at the periphery of the sensing area SA. In some embodiments, the sensing area SA may be disposed to overlap at least one area of the display area DA. In an example, the sensing area SA may be set as an area corresponding to the display area DA (e.g., an area overlapping with the display area DA), and the peripheral area NSA may be set as an area corresponding to the non-display area NDA (e.g., an area overlapping with the non-display area NDA). When a touch input or the like is applied to the display area DA, the touch input may be detected through the sensor unit 120.

The sensor substrate 121 may be a rigid or flexible substrate. In addition, the sensor substrate 121 may be configured with at least one insulating layer. While the sensor substrate 121 may be a transparent or translucent light transmission substrate, the present disclosure is not limited thereto. That is, in the present disclosure, the material and property of the sensor substrate 121 are not particularly limited. For example, the sensor substrate 121 may be a rigid substrate configured with glass or tempered glass, or a flexible substrate configured with a thin film made of plastic or metal. In some embodiments, at least one substrate (e.g., the display substrate 111, an encapsulation substrate, and/or a thin film encapsulation layer) which constitutes the display unit 110, or at least one insulating layer, at least one functional layer, or the like, which is disposed at the inside and/or an outer surface of the display 110, may be used as the sensor substrate 121.

The sensing area SA is set as an area capable of reacting or responding to a touch input (i.e., an active area of sensors). A plurality of sensors SC for sensing a touch input or the like may be disposed in the sensing area SA. In some embodiments, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction intersecting the first direction DR1. Each of the first sensors TX may have a form in which first cells having a relatively wide area and first bridges having a relatively narrow area are connected to each other. Although a case where each of the first cells has a diamond shape is illustrated in FIG. 1, each of the first cells may be configured in various shapes including a circular shape, a quadrangular shape, a triangular shape, a mesh shape, and the like. For example, the first bridges may be integrally formed with the first cells on the same layer. In another embodiment, the first bridges may be formed in a layer different from a layer of the first cells, to electrically connect adjacent first cells to each other.

For example, each of the second sensors RX may extend in the second direction DR2. The second sensors RX may be arranged in the first direction DR1. Each of the second sensors RX may have a form in which second cells having a relatively wide area and second bridges having a relatively narrow area are connected to each other. Although a case where each of the second cells has a diamond shape is illustrated in FIG. 1, each of the first cells may be configured in various shapes including a circular shape, a quadrangular shape, a triangular shape, a mesh shape, and the like. For example, the second bridges may be integrally formed with the second cells on the same layer. In another embodiment, the second bridges may be formed in a layer different from a layer of the second cells, to electrically connect adjacent second cells to each other.

In some embodiments, each of the first sensors TX and the second sensors RX may include at least one of a metal material, a transparent conductive material, and various other conductive materials, thereby having conductivity. In an example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. The first sensors TX and the second sensors RX may be configured in a mesh shape. Also, the first sensors TX and the second sensors RX may include at least one of various transparent conductive materials including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and the like. In addition, the first sensors TX and the second sensors RX may include at least one of various conductive materials, thereby having conductivity. Also, each of the first sensors TX and the second sensors RX may be configured as a single layer or a multi-layer, but a sectional structure thereof is not limited thereto.

Sensor lines for electrically connecting the first and second sensors TX and RX to the sensor driver 220, and the like may be disposed in the peripheral area NSA. For example, the sensor lines may be concentrically disposed in the peripheral area NSA.

The driving circuit 20 may include the display driver 210 for driving the display unit 110 and the sensor driver 220 for driving the sensor unit 120. In an embodiment, the display driver 210 and the sensor driver 220 may be configured as Integrated Chips (ICs) separate from each other. In another embodiment, at least a portion of the display driver 210 and at least a portion of the sensor driver 220 may be integrated together in one IC.

The display driver 210 is electrically connected to the display unit 110 to drive the pixels PX. For example, the display device 210 may include a data driver (e.g., a first driver circuit) and a timing controller (e.g., a controller circuit), and a scan driver (e.g., a second driver circuit) may be separately mounted in the non-display area NDA of the display unit 110. In another embodiment, the display driver 210 may include all or at least some of the data driver, the timing controller, and the scan driver.

The display driver 210 may be supplied with image data and control signals from an application processor. A first oscillator (not shown) for generating a first clock signal may be located inside the display driver 210. The display driver 210 may determine a driving frequency (or frame rate), using synchronization signals included in the control signals, and generate various signals including a vertical synchronization signal Vsync and a horizontal synchronization signal Hsync by dividing the first clock signal.

In an example, an external vertical synchronization signal, an external horizontal synchronization signal, and the like may be included in the control signals supplied to the display driver 210 from the application processor. The display deriver 210 may generate the vertical synchronization signal Vsync and the horizontal synchronization signal Hsync, which are to be used inside the display device 1, using the external vertical synchronization signal and the external horizontal synchronization signal.

Also, the display driver 210 may be supplied with an external mode control signal from the application processor. In an embodiment, the external mode control signal includes data used for setting the first display area and the second display area.

The display driver 210 may set the first display area and the second display area of the display unit 110, based on the external mode control signal. The display driver 210 may generate the mode control signal, based on the first display area set in the display unit 110 and the second display area set in the display unit 110 in a current frame.

The sensor driver 220 may set a first touch area corresponding to the first display area and a second touch area corresponding to the second display area, based on the mode control signal. For example, when the first display area is set at an upper half of the display unit 110 and the second display area is set at a lower half of the display unit 110, the sensor driver 220 may set the first touch area at an upper half of the sensor unit 120, and set the second touch area at a lower half of the sensor unit 120.

When the first display area is set at a left half of the display unit 110 and the second display area is set at a right half of the display unit 110, the sensor driver 220 may set the first touch area at a left half of the sensor unit 120, and set the second touch area at a right half of the sensor unit 120.

In an embodiment, the first touch area has a touch sensitivity higher than a touch sensitivity of the second touch area. In an embodiment, the sensor driver 220 controls the sensor unit 120 such that the touch sensitivity of the first touch area becomes higher than the touch sensitivity of the second touch area.

The display driver 210 may transfer information of the first display area and the second display area to the sensor driver 220 through the mode control signal separate from the vertical synchronization signal Vsync and the horizontal synchronization signal Hsync.

In an embodiment, the display driver 210 includes a dedicated pin for transmitting the mode control signal, and the sensor driver 220 may include a dedicated pin (not shown) for receiving the mode control signal.

Since the mode control signal includes information of the first display area and the second display area, time required for the sensor driver 220 to set the first touch area and the second touch area can be shortened, and power consumed for the sensor driver 220 to set the first touch area can be decreased.

Figure 2:
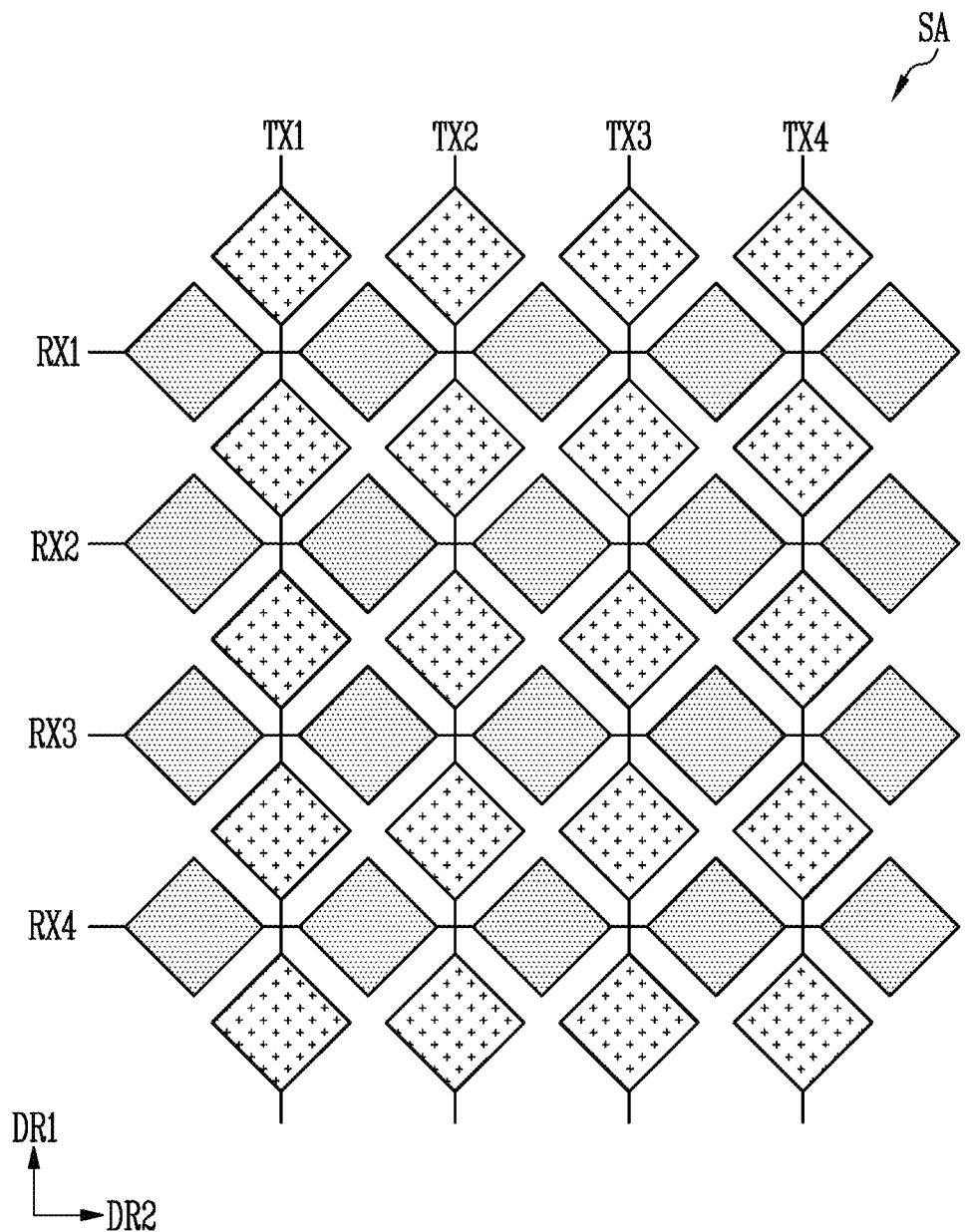
FIG. 2 is a diagram illustrating an embodiment of sensors included in the display device shown in FIG. 1.

FIG. 2 is a diagram illustrating an embodiment of the sensors included in the display device shown in FIG. 1.

Referring to FIGS. 1 and 2, first sensors TX1, TX2, TX3, and TX4 and second sensors RX1, RX2, RX3, and RX4, which are located in the sensing area SA, are exemplarily illustrated. For convenience of description, it is assumed that four first sensors TX1 to TX4 are disposed in the sensing area SA and four second sensors RX1 to RX4 are disposed in the sensing area SA. Here, there may be y to p first sensors TX and y to p second sensors RX, where y is a natural number and p is a natural number greater than y.

Descriptions of the first sensors TX1 to TX4 and the second sensors RX1 to RX4 are identical to the descriptions of the first sensors TX and the second sensors RX, which are shown in FIG. 1, and therefore, overlapping descriptions will be omitted.

Figure 3:
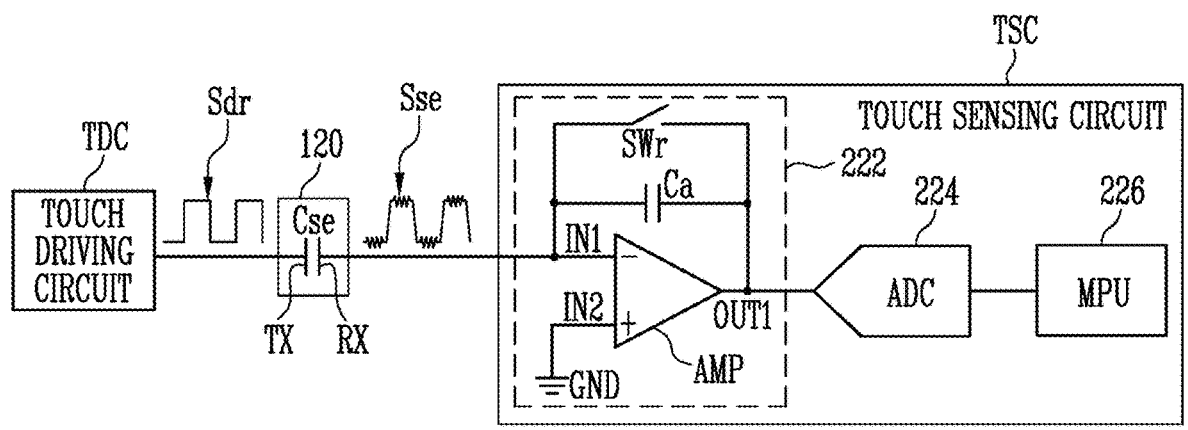
FIGS. 3 and 4 are diagrams illustrating a touch sensing period.
Figure 4:
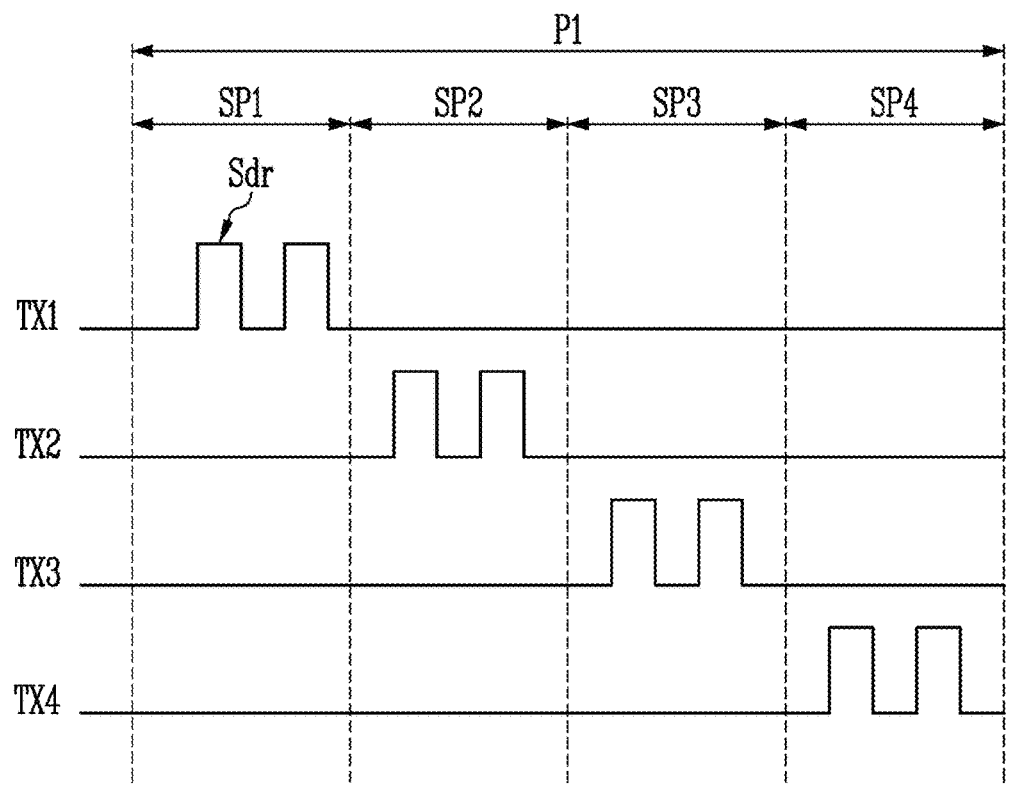

FIGS. 3 and 4 are diagrams illustrating a touch sensing period.

Referring to FIGS. 1 to 4, the touch sensing period may be a period in which the sensor unit 120 and the sensor driver 220 sense an external touch. In FIG. 3, driving of the sensor unit 120 and the sensor driver 220 during the touch sensing period will be illustrated based on one sensor channel 222.

The sensor driver 220 may include a sensor receiver TSC (e.g., a touch sensing circuit) and a sensor transmitter TDC (e.g., a touch driving circuit). In the touch sensing period, the sensor transmitter TDC may be connected to the first sensors TX, and the sensor receiver TSC may be connected to the second sensors RX.

The sensor receiver TSC may include an operational amplifier AMP, an analog-to-digital converter 224 (e.g., an ADC), and a processor 226. For example, the processor 226 may be a microprocessor (MPU). In an example, each sensor channel 222 may be implemented as an analog front end (AFE) including at least one operational amplifier AMP. The analog-to-digital converter 224 and the processor 226 may be provided for each sensor channel 222, and be shared by a plurality of sensor channels 222.

A first input terminal IN1 of the operational amplifier AMP may be connected to corresponding second sensors RX, and a second input terminal IN2 of the operational amplifier AMP may be connected to a ground GND. For example, the first input terminal IN1 may be an inverting terminal, and the second input terminal IN2 may be a non-inverting terminal. In some embodiments, the second input terminal IN2 may be connected to a signal having a voltage of a specific magnitude.

The analog-to-digital converter 224 may be connected to an output terminal OUT1 of the operational amplifier AMP. The analog-to-digital converter 224 may convert an output of the operational amplifier AMP into a sensing value in a digital form and then output the sensing value. A capacitor Ca and a switch SWr may be connected in parallel between the first input terminal IN1 and the output terminal OUT1.

Referring to FIG. 4, during the touch sensing period, the sensor driver 220 (e.g., the sensor transmitter TDC) may supply a driving signal Sdr to each of first sensors TX1 to TX4. In an embodiment, the driving signal Sdr is an alternating current (AC) signal having a predetermined cycle, such as a pulse wave. One period P1 in which the first sensors TX1 to TX4 are sequentially driven may include a plurality of sub-periods SP1 to SP4 in which the driving signal Sdr is supplied to each of the first sensors TX1 to TX4.

Due to a mutual capacitance Cse which each of the first sensors TX1 to TX4 forms with second sensors RX1 to RX4 at the periphery thereof, a sensing signal Sse corresponding to the driving signal Sdr applied to the first sensors TX1 to TX4 may be output through the second sensors RX1 to RX4. The sensing signal Sse may be input to the sensor receiver TSC and used for detection of a touch input. In an embodiment, the driving signal Sdr shown in FIG. 4 is supplied to the second touch area.

In an embodiment, when the sensor unit 120 includes a plurality of second sensors RX as shown in FIG. 1, the sensor receiver TSC includes a plurality of sensing channels (or receiving channels) 222 electrically connected to each of the second sensors RX. The sensor receiver TSC may receive a sensing signal Sse from each of the second sensors RX through the sensing channel 222, and detect a touch input by synthesizing the received sensing signals Sse.

Figure 5:
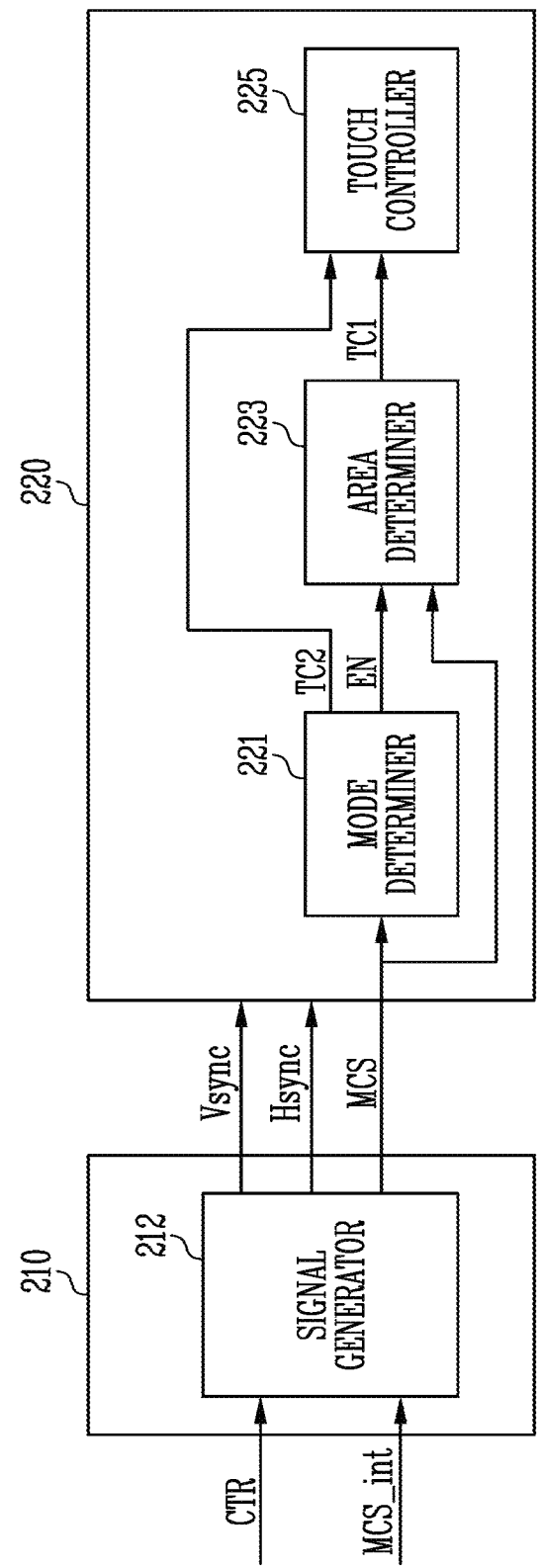
FIG. 5 is a block diagram illustrating an embodiment of a display driver and a sensor driver, which are shown in FIG. 1.

FIG. 5 is a block diagram illustrating an embodiment of the display driver and the sensor driver, which are shown in FIG. 1.

Referring to FIG. 5, the display driver 210 may output a vertical synchronization signal Vsync, a horizontal synchronization signal Hsync, and a mode control signal MCS.

The display driver 210 may include a signal generator 212 and an oscillator. The oscillator may generate a clock signal to be used inside the display driver 210.

The signal generator 212 may be supplied with a control signal CTR and an external mode control signal MCS_int from the outside (e.g., an application processor or the like). The signal generator 212 supplied with the control signal CTR may generate the vertical synchronization signal Vsync and the horizontal synchronization signal Hsync by dividing the clock signal. The cycle of the vertical synchronization signal Vsync may correspond to a frame period. The frame period may mean a period in which an image of one screen is displayed on the display unit 110.

The cycle of the horizontal synchronization signal Hsync may correspond to a horizontal period. The horizontal period may mean a period in which a data signal is supplied to pixels located on one horizontal line (e.g., a pixel row on which pixels connected to the same scan line are located).

The signal generator 212 supplied with the external mode control signal MCS_int may generate the mode control signal MCS. The signal generator 212 may generate the mode control signal MCS for each cycle of the vertical synchronization signal Vsync, and output the generated mode control signal MCS to the sensor driver 220. That is, the signal generator 212 may transmit the mode control signal MCS to the sensor driver 220, based on the first display area and the second display area of the display unit 110 set in a current frame.

In an embodiment, the sensor driver 220 includes a mode determiner 221 (e.g., a first logic circuit), an area determiner 223 (e.g., a second logic circuit), and a touch controller 225 (e.g., a controller circuit).

The mode determiner 221 may determine whether the display unit 110 includes the first display area, based on the mode control signal MCS. When a voltage level of the mode control signal MCS is changed, the mode determiner 221 may determine that the display unit 110 includes the first display area. That is, when the display unit 110 includes the first display area, the mode control signal MCS may include at least one pulse.

In an embodiment, the mode determiner 221 transmits an enable signal EN to the area determiner 223 when it is determined that the display unit 110 includes the first display area.

When the area determiner 223 receives the enable signal EN, the area determiner 223 may determine a range of the first display area, based on the mode control signal MCS. For example, the area determiner 223 may determine the extent, area, and location of the first display area, based on the mode control signal MCS. The area determiner 223 may transmit, to the touch controller 225, a first touch control signal TC1 including information about the first display area. In an embodiment, the first touch control signal TC1 includes information on the range of the first display area and a position of the first display area. For example, the range may indicate a length and width when the display area has a rectangular shape or one or more radiuses or diameters when the when the display area has a circular or elliptical shape, but is not limited thereto. For example, the range may indicate various lengths or widths to represent various other shapes.

When the voltage level of the mode control signal MCS is maintained or constant, the mode determiner 221 may determine that the display unit 110 does not include the first display area. For example, when the display unit 110 does not include the first display area, the whole of the display unit 110 may be set to the second display area.

When it is determined that the display unit 110 does not include the first display area, the mode determiner 221 may transmit a second touch control signal TC2 to the touch controller 225.

The touch controller 225 may control overall operations of the sensor driver 220. The sensor transmitter TDC and the sensor receiver TSC may be included in the touch controller 225. The touch controller 225 may control the sensor unit 120, based on the first touch control signal TC1 and the second touch control signal TC2.

When the touch controller 225 receives the first touch control signal TC1, the touch controller 225 may supply a first driving signal to a first touch area corresponding to the first display area, and supply a second driving signal to a second touch area different from the first touch area in the sensor unit 120.

For example, when the first touch control signal TC1 indicates that the first display area is an upper half of the display unit 110, the touch controller 225 may supply the first driving signal to an upper half of the sensor unit 120, and supply the second driving signal to a lower half of the sensor unit 120.

In another example, when the first touch control signal TC1 indicates that the first display area is a lower half of the display unit 110, the touch controller 225 may supply the first driving signal to the lower half of the sensor unit 120, and supply the second driving signal to the upper half of the sensor unit 120. The first driving signal will be described in detail later with reference to FIGS. 13 and 14.

When the touch controller 225 receives the second touch signal TC2, the touch controller 225 may supply the second driving signal to the sensor unit 120. That is, the touch controller 225 may treat the whole of the sensor unit 120 as the second touch area.

In an embodiment, each of the display driver 210 and the sensor driver 220 include a dedicated pin for transmitting/receiving the mode control signal MCS.

Figure 6:
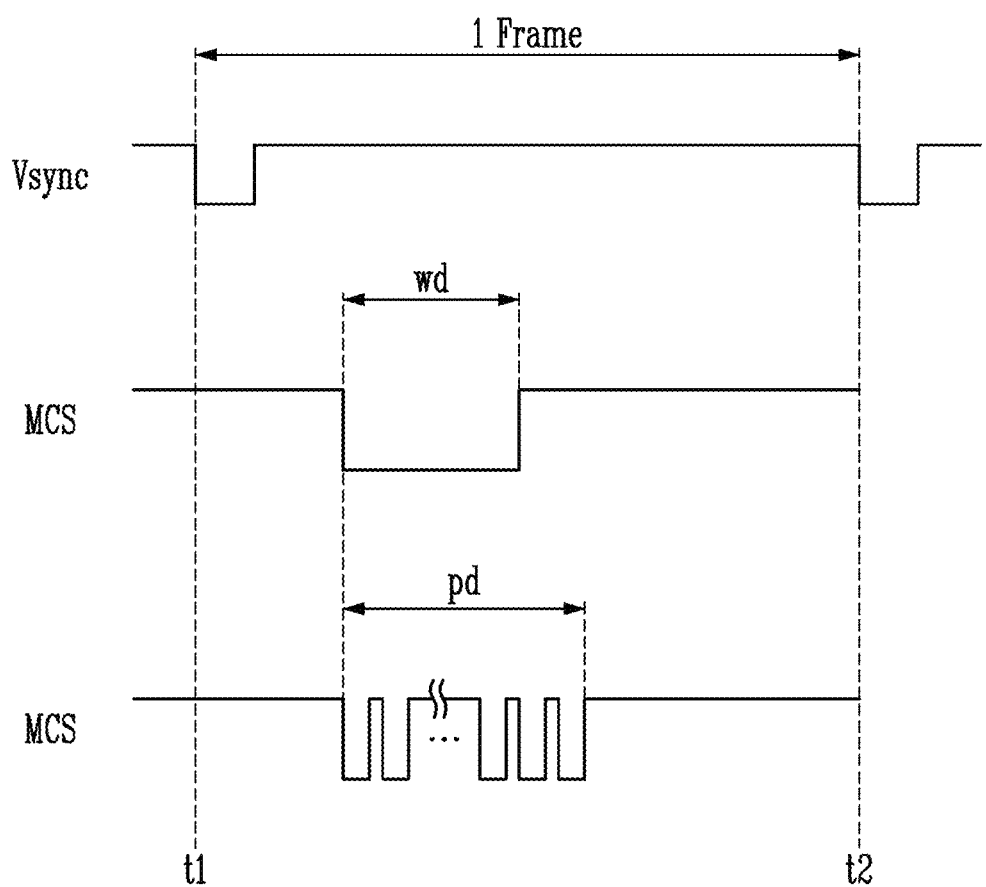
FIG. 6 is a diagram illustrating an embodiment of a mode control signal shown in FIG. 5.

FIG. 6 is a diagram illustrating embodiments of the mode control signal (MCS) shown in FIG. 5.

Referring to FIGS. 5 and 6, a mode control signal MCS which the signal generator 212 generates for each cycle of a vertical synchronization signal Vsync between a time t1 and a time t2 is illustrated.

Referring to a mode control signal MCS having a pulse width wd, the signal generator 212 may control a width wd of a first pulse of the mode control signal MCS according to a range of the first display area of the display unit 110 set in a current frame 1 Frame.

For example, when the whole of the display unit 110 is set as the first display area, the signal generator 212 may generate the mode control signal MCS having a pulse width wd greater than a first reference value. When a half of the display unit 110 is set as the first display area, the signal generator 212 may generate the mode control signal MCS having a pulse width wd which is the first reference value or less and is greater than a second reference value.

A position of the half area of the display unit 110 may be pre-specified according to a setting of a user of the display device 1. For example, an upper half of the display unit 110 is set as the first display area, or a lower half of the display unit 110 may be set as the first display area. The first reference value and the second reference value may be pre-specified according to the setting of the user of the display device 1.

When an area smaller than the half of the display unit 110 is set as the first display area, the signal generator 212 may generate the mode control signal MCS having a pulse width wd which is the second reference value or less. A position of the area smaller than the half of the display unit 110 may be pre-specified according to the setting of the user of the display device 1.

Referring to a mode control signal MCS including a plurality of pulses during a pulse period pd, the signal generator 212 may generate the mode control signal MCS including a number of pulses, which corresponds to the range of the first display area of the display unit 110 set in the current frame 1 Frame.

For example, when the whole of the display unit 110 is the first display area, the signal generator 212 may generate the mode control signal including a number of pulses, which is greater than a third reference value. When a half of the display unit 110 is the first area, the signal generator 212 may generate the mode control signal MCS including a number of pulses, which is the third reference value or less and is greater than a fourth reference value. A position of the half area of the display unit 110 may be pre-specified according to the setting of the user of the display device 1.

When an area smaller than the half of the display unit 110 is the first display area, the signal generator 212 may generate the mode control signal including a number of pulses, which is the fourth reference value or less. A position of the area smaller than the half of the display unit 110 may be pre-specified according to the setting of the user of the display device 1.

The area determiner 223 may determine a range of the first display area, based on the width wd of a pulse included in the mode control signal MCS or the number of pulses included in the mode control signal MCS.

For example, when the width wd of the pulse included in the mode control signal MCS is the first reference value or less and is greater than the second reference value, the area determiner 223 may determine that the first display area is a half of the display unit 110.

Also, the area determiner 223 may determine a position of the first display area according to a pre-specified setting of the user. For example, when it is determined that a half of the display unit 110 is the first display area, the area determiner 223 may determine whether an upper half of the display unit 110 is the first display area or a lower half of the display unit 110 is the first display area, according to predetermined data. The predetermined data may be stored in a memory included in each of the display driver 210 and the sensor driver 220.

Figure 7:
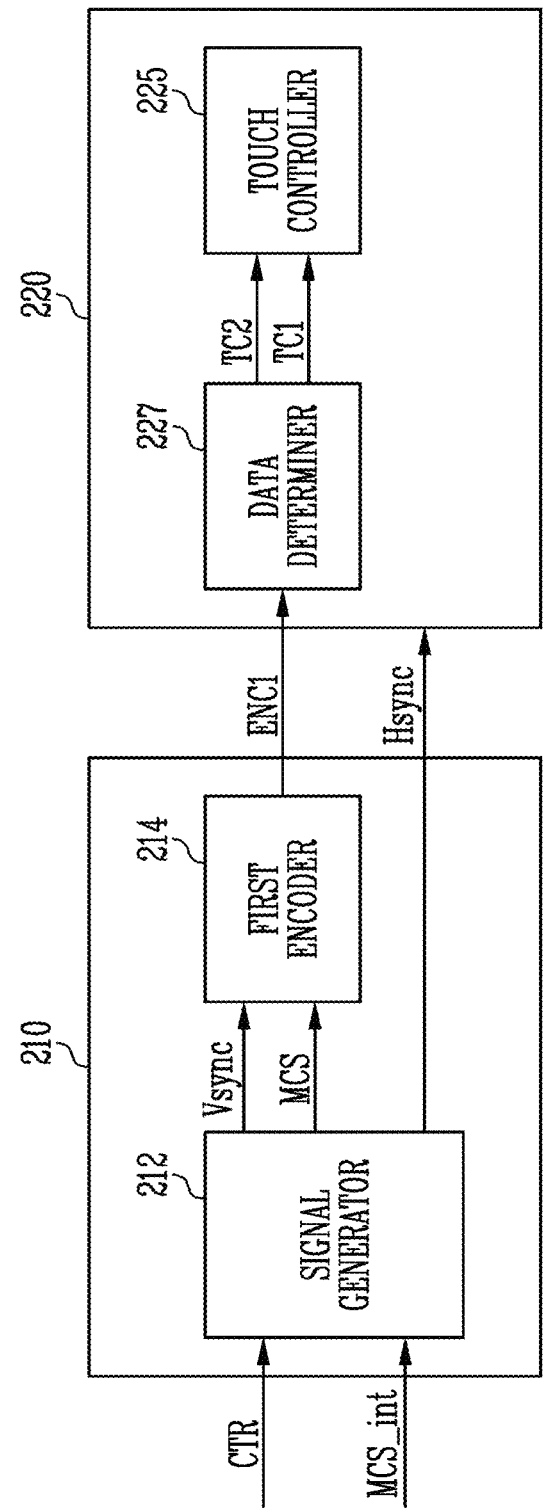
FIG. 7 is a block diagram illustrating an embodiment of the display driver and the sensor driver, which are shown in FIG. 1.

FIG. 7 is a block diagram illustrating an embodiment of the display driver and the sensor driver, which are shown in FIG. 1.

Referring to FIG. 7, the display driver 210 may output a first encoding signal ENC1 and a horizontal synchronization signal Hsync to the sensor driver 220.

A signal generator 212 and a touch controller 225, which are shown in FIG. 7, are respectively similar to the signal generator 212 and the touch controller 225, which are shown in FIG. 5, and therefore, detailed descriptions will be omitted.

The display driver 210 may include the signal generator 212, a first encoder 214 (e.g., a logic circuit), and an oscillator. The oscillator (not shown) may generate a clock signal to be used inside the display driver 210.

The signal generator 212 may generate a mode control signal MCS, based on the first display area and the second display area of the display unit 110 set in a current frame.

The first encoder 214 may encode a vertical synchronization signal Vsync and the mode control signal MCS, thereby generating the first encoding signal ENC1. An embodiment of the mode control signal MCS and the first encoding signal ENC1 will be described in detail later with reference to FIGS. 8 to 10.

The sensor driver 220 may include a data determiner 227 (e.g., a logic circuit) and the touch controller 225 (e.g., a controller circuit).

The data determiner 227 may determine whether the display unit 110 includes the first display area, based on the first encoding signal ENC1. When the display unit 110 includes the first display area, the data determiner 227 may determine a range of the first display area and a position of the first display area.

In an embodiment, the data determiner 227 may determine the range of the first display area, based on the width of a first pulse of the first encoding signal ENC1. This will be described in detail later with reference to FIG. 8.

In another embodiment, the data determiner 227 may determine the range of the first display area and the position of the first display area, based on a data value corresponding to the first encoding signal ENC1. This will be described in detail later with reference to FIGS. 9 and 10.

In still another embodiment, the data determiner 227 may determine whether the display unit 110 includes the first display area, based on signals obtained by decoding the first encoding signal ENC1, and determine the range of the first display area and the position of the first display area.

When it is determined that the display unit 110 includes the first display area, the data determiner 227 may transmit, to the touch controller 225, a first touch control signal TC1 including the range of the first display area and the position of the first display area.

When it is determined that the display unit 110 does not include the first display area, the data determiner 227 may transmit a second touch control signal TC2 to the touch controller 225.

Figure 8:
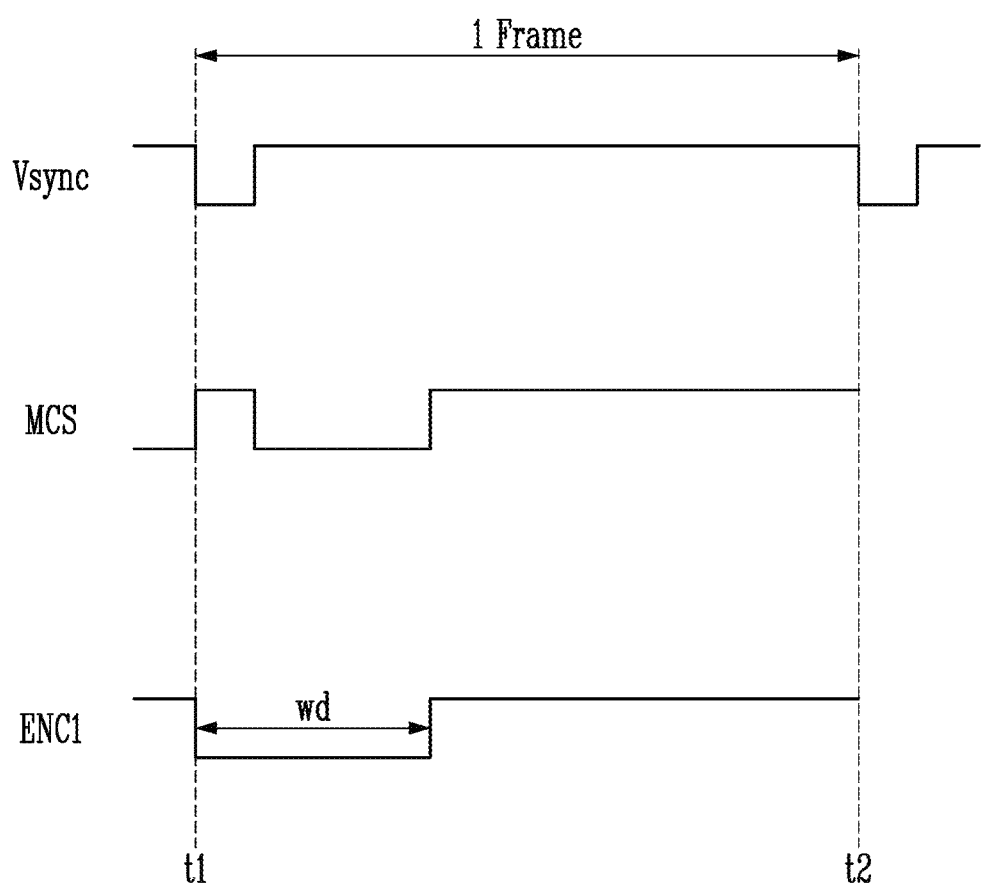
FIG. 8 is a diagram illustrating an embodiment of a mode control signal and a first encoding signal, which are shown in FIG. 7.

FIG. 8 is a diagram illustrating an embodiment of the mode control signal and the first encoding signal, which are shown in FIG. 7.

Referring to FIGS. 7 and 8, a mode control signal MCS and a first encoding signal ENC1, which the signal generator 212 generates during a cycle of a vertical synchronization signal Vsync between a time t1 and a time t2, are illustrated. The signal generator 212 may generate the mode control signal MCS and the first encoding signal ENC1 for each cycle of the vertical synchronization signal Vsync.

In an embodiment, the signal generator 212 may generate the mode control signal MCS, based on a range of the first display area of the display unit 110 set in a current frame 1 Frame.

The first encoder 214 may generate the first encoding signal ENC1 by encoding the vertical synchronization signal Vsync and the mode control signal MCS. Referring to FIG. 8, it is illustrated that the first encoder 214 performs a logical product (AND) operation on the vertical synchronization signal Vsync and the mode control signal MCS to generate the first encoding signal ENC1. However, the present disclosure is not limited thereto, and the first encoder 214 may generate the first encoding signal ENC1, using various encoding methods.

The data determiner 227 may determine the range of the first display area, based on a width wd of a first pulse of the first encoding signal ENC1. For example, when the pulse width wd is greater than a first reference value, the data determiner 227 may determine the whole of the display unit 110 as the first display area.

When a pulse width wd is the first reference value or less and is greater than a second reference value, the data determiner 227 may determine a half of the display unit 110 as the first display area. When the half of the display unit 110 is determined as the first display area, the data determiner 227 may determine a position of the half area of the display unit 110 according to a predetermined value.

For example, when the half of the display unit 110 is determined as the first display area, the data determiner 227 may determine an upper half of the display unit 110 as the first display area, based on the predetermined value.

When the pulse width wd is the second reference value or less, the data determiner 227 may determine an area smaller than the half of the display unit 110 as the first display area. When the area smaller than the half of the display unit 110 is determined as the first display area, the data determiner 227 may determine a position of the area smaller than the half of the display unit 110 according to the predetermined value.

Figure 9:
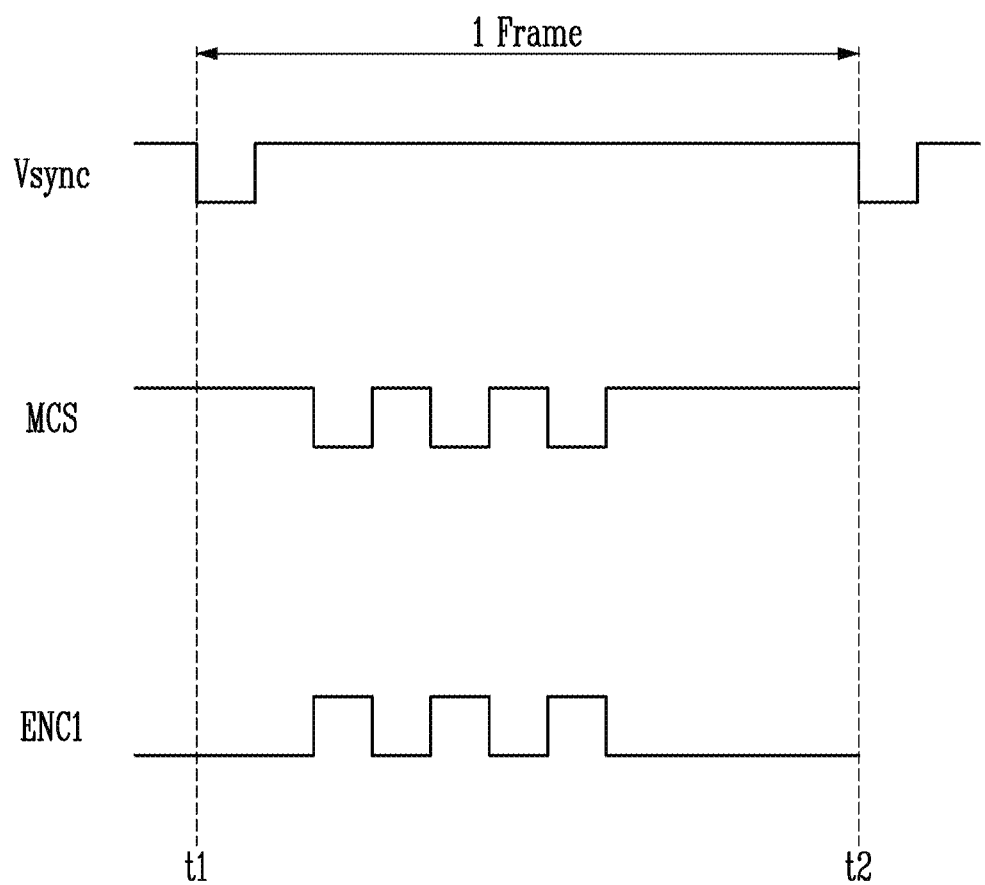
FIG. 9 is a diagram illustrating an embodiment of the mode control signal and the first encoding signal, which are shown in FIG. 7.

FIG. 9 is a diagram illustrating an embodiment of the mode control signal and the first encoding signal, which are shown in FIG. 7.

Referring to FIGS. 7 and 9, a mode control signal MCS and a first encoding signal ENC1, which the signal generator 212 generates during a cycle of a vertical synchronization signal Vsync between a time t1 and a time t2, are illustrated. The signal generator 212 may generate the mode control signal MCS and the first encoding signal ENC1 for each cycle of the vertical synchronization signal Vsync.

The first encoding signal ENC1 may include a plurality of pulses. The first encoding signal ENC1 shown in FIG. 9 may be generated using an encoding method different from the encoding method of the first encoding signal ENC1 shown in FIG. 8.

In an embodiment, the signal generator 212 may generate the mode control signal MCS including a number of pulses, which corresponds to a range of the first display area of the display unit 110 set in a current frame 1 Frame.

For example, when the whole of the display unit 110 is the first display area, the signal generator 212 may generate the mode control signal MCS including a number of pulses, which is greater than a third reference value. When a half of the display unit 110 is the first display area, the signal generator 212 may generate the mode control signal MCS including a number of pulses, which is the third reference value or less and is greater than a fourth reference value. A position of the half area of the display unit 110 may be pre-specified according to a setting of the user of the display device 1.

When an area smaller than the half of the display unit 110 is the first area, the signal generator 212 may generate the mode control signal MCS including a number of pulses, which is the fourth reference value or less. A position of the area smaller than the half of the display unit 110 may be pre-specified according to the setting of the user of the display device 1.

In an embodiment, the data determiner 227 may determine the range of the first display area, based on a data value corresponding to the first encoding signal ENC1. The data determiner 227 may determine a position of the first display area according to a pre-specified value with respect to the range of the first display area. For example, the pre-specified value with respect to the range of the first display area may be an upper side of the display unit 110 or a lower side of the display unit 110.

In an embodiment, the data determiner 227 may determine the range of the first display area and the position of the first display area, based on the data value corresponding to the first encoding signal ENC1. For example, the data determiner 227 may compare the data value corresponding to the first encoding signal ENC1 with a predetermined data value according to the range of the first display area and the position of the first display area, thereby determining the range of the first display area and the position of the first display area.

Figure 10:
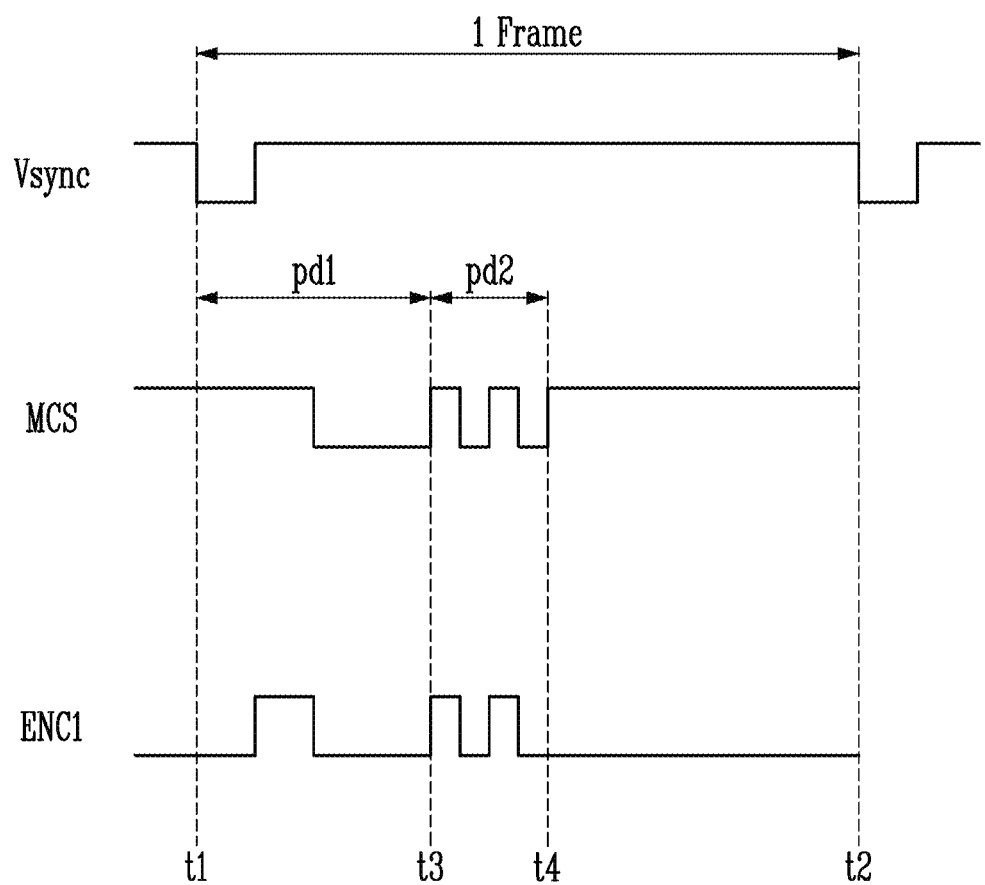
FIG. 10 is a diagram illustrating an embodiment of the mode control signal and the first encoding signal, which are shown in FIG. 7.

FIG. 10 is a diagram illustrating an embodiment of the mode control signal and the first encoding signal, which are shown in FIG. 7.

Referring to FIGS. 7 to 10, a mode control signal MCS and a first encoding signal ENC1, which the signal generator 212 generates during a cycle of a vertical synchronization signal Vsync between a time t1 and a time t2, are illustrated. The signal generator 212 may generate the mode control signal MCS and the first encoding signal ENC1 for each cycle of the vertical synchronization signal Vsync.

When the display unit 110 set in a current frame 1 Frame includes the first display area, the signal generator 212 may output a pulse signal having a first duration as the mode control signal MCS during a period pd1 between the time t1 and a time t3. That is, the pulse signal having the first duration during the period pd1 may indicate whether the display unit 110 includes the first display area.

According to a range of the first display area of the display unit 110 set in the current frame 1 Frame, the signal generator 212 may output a pulse signal having a second duration as the mode control signal MCS during a period pd2 between the time t3 and a time t4. That is, the pulse signal having the second duration during the period pd2 may indicate the range of the first display area included in the display unit 110. The second duration may be different from the first duration.

In an embodiment, the signal generator 212 may generate the mode control signal MCS including a number of pulses, which corresponds to the range of the first display area.

When the whole of the display unit 110 is the first display area, the signal generator 212 may generate the mode control signal having a number of pulses, which is greater than a third reference value. When a half of the display unit 110 is the first display area, the signal generator 212 may generate the mode control signal MCS including a number of pulses, which is the third reference value or less and is greater than a fourth reference value. A position of the half area of the display unit 110 may be pre-specified according to a setting of the user of the display device 1.

When an area smaller than the half of the display unit 110 is the first display area, the signal generator 212 may generate the mode control signal MCS including a number of pulses, which is the fourth reference value or less. A position of the area smaller than the half of the display unit 110 may be pre-specified according to the setting of the user of the display device 1.

In an embodiment, the data determiner 227 may determine the range of the first display area, based on a data value corresponding to the first encoding signal ENC1. The data determiner 227 may determine a position of the first display area according to a pre-specified setting of the user. For example, when the half of the display unit 110 is determined as the first display area, the data determiner 227 may determine whether an upper half of the display unit 110 is the first display area or a lower half of the display unit 110 is the first display area, according to the pre-specified setting of the user.

In an embodiment, the data determiner 227 may determine the range of the first display area and the position of the first display area, based on the data value corresponding to the first encoding signal ENC1. For example, the data determiner 227 may compare the data value corresponding to the first encoding signal ENC1 with a predetermined data value according to the range of the first display area and the position of the first display area, thereby determining the range of the first display area and the position of the first display area.

Figure 11:
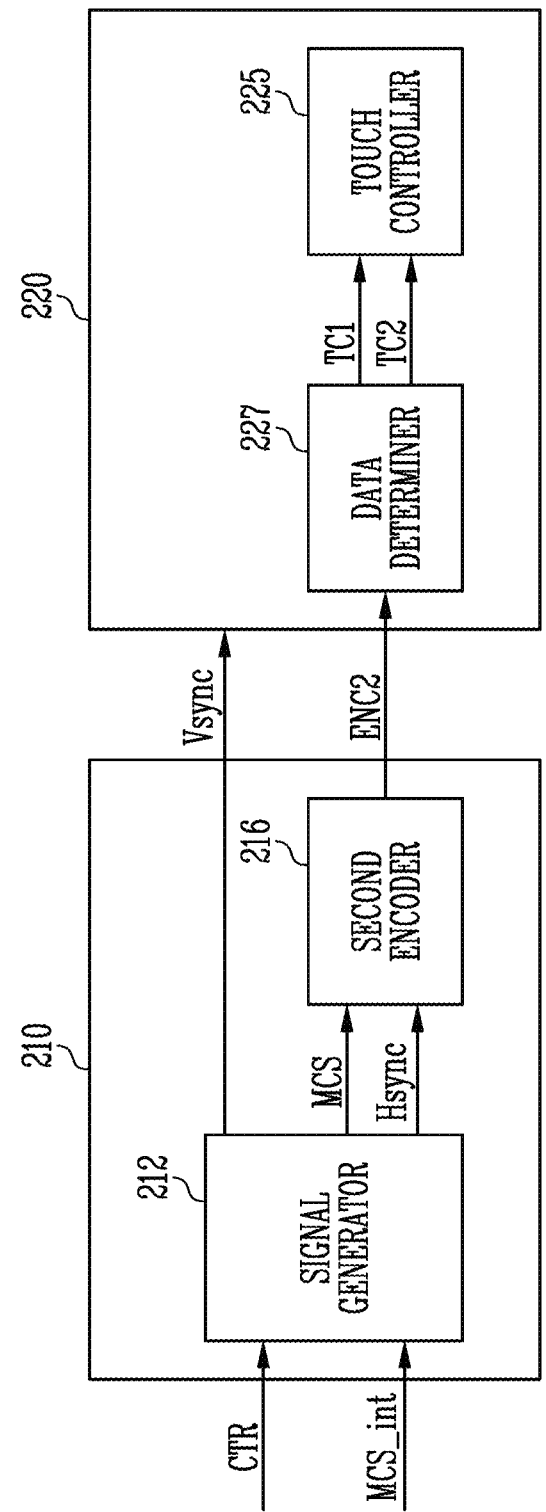
FIG. 11 is a block diagram illustrating an embodiment of the display driver and the sensor driver, which are shown in FIG. 1.

FIG. 11 is a block diagram illustrating an embodiment of the display driver and the sensor driver, which are shown in FIG. 1.

Referring to FIG. 11, the display driver 210 may output a second encoding signal ENC2 and a vertical synchronization signal Vsync to the sensor driver 220. A signal generator 212 and a touch controller 225, which are shown in FIG. 11, are respectively similar to the signal generator 212 and the touch controller 225, which are shown in FIG. 5, and therefore, detailed descriptions will be omitted.

The display driver 210 may include the signal generator 212, a second encoder 216 (e.g., a logic circuit), and an oscillator. The oscillator may generate a clock signal to be used inside the display driver 210.

The signal generator 212 may generate a mode control signal MCS, based on the first display area and the second display area of the display unit 110 set in a current frame. When the display unit 110 includes the first display area, the signal generator 212 may output a pulse signal as a mode control signal MCS during a control period in a period of the frame.

The second encoder 216 may encode a horizontal synchronization signal Hsync and the mode control signal MCS, thereby generating the second encoding signal ENC2. An embodiment of the mode control signal MCS and the second encoding signal ENC2 will be described in detail later with reference to FIG. 13.

The sensor driver 220 may include a data determiner 227 and the touch controller 225.

The data determiner 227 may determine whether the display unit 110 includes the first display area, based on the second encoding signal ENC2. When the display unit 110 includes the first display area, the data determiner 227 may determine a range of the first display area and a position of the first display area.

In an embodiment, the data determiner 227 may determine the range of the first display area and the position of the first display area, based on a data value corresponding to the second encoding signal ENC2. This will be described in detail later with reference to FIG. 12.

In another embodiment, the data determiner 227 may determine whether the display unit 110 includes the first display area, based on signals obtained by decoding the second encoding signal ENC2, and determine the range of the first display area and the position of the first display area.

When it is determined that the display unit 110 includes the first display area, the data determiner 227 may transmit, to the touch controller 225, a first touch control signal TC1 including the range of the first display area and the position of the first display area. When it is determined that the display unit 110 does not include the first display area, the data determiner 227 may transmit a second touch control signal TC2 to the touch controller 225.

Figure 12:
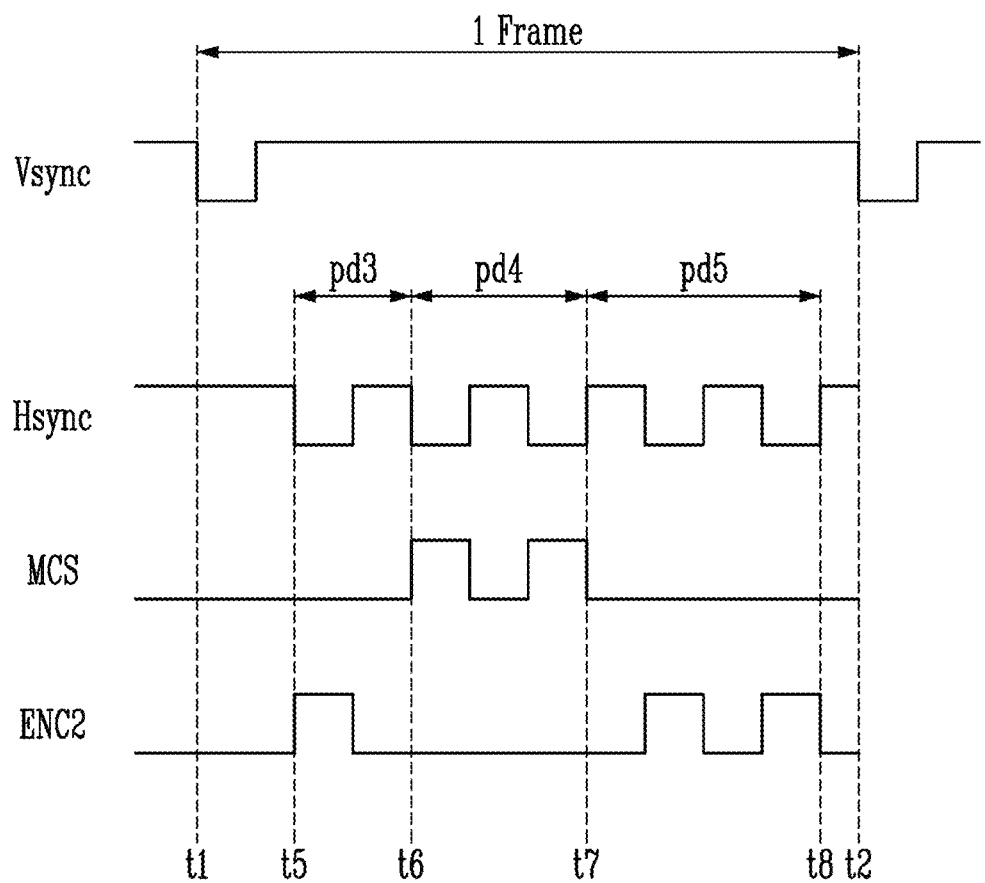
FIG. 12 is a diagram illustrating an embodiment of a mode control signal and a second encoding signal, which are shown in FIG. 11.

FIG. 12 is a diagram illustrating an embodiment of the mode control signal and the second encoding signal, which are shown in FIG. 11.

Referring to FIGS. 11 and 12, a horizontal synchronization signal Hsync, a mode control signal MCS, and a second encoding signal ENC2, which the signal generator 212 generates for each cycle of a vertical synchronization signal Vsync between a time t1 and a time t2, are illustrated.

When the display unit 110 set in a current frame 1 Frame includes the first display area, the signal generator 212 may output a pulse signal as the mode control signal MCS during a period pd4 between a time t6 and a time t7. When the display unit 110 does not include the first display area, the signal generator 212 may output a signal having no pulse as the control mode signal MCS during the period pd4 between the time t6 and the time t7. The period pd4 between the time t6 and the time t7 may be designated as a control period in a period of the frame.

The data determiner 227 may recognize the second encoding signal ENC2 as the horizontal synchronization signal Hsync during a period pd3 between a time t5 and the time t6 and a period pd5 between the time t7 and a time t8. Start points t5 and t7 and end points t6 and t8 of the respective periods pd3 and pd5 in which the second encoding signal ENC is recognized as the horizontal synchronization signal Hsync may be pre-defined according to a setting of the user of the display unit 110.

During the period between the time t6 and the time t7, the data determiner 227 may determine a range of the first display area and a position of the first display area, based on a data value corresponding to the second encoding signal ENC2. For example, a data value according to the range of the first display area and the position of the first display area may be pre-defined by the user. In addition, the start point t6 and the end point t7 of the period pd4 in which the range of the first display area and the position of the first display area are determined, based on the data value corresponding to the second encoding signal ENC2, may be pre-defined according to the setting of the user.

Figure 13:
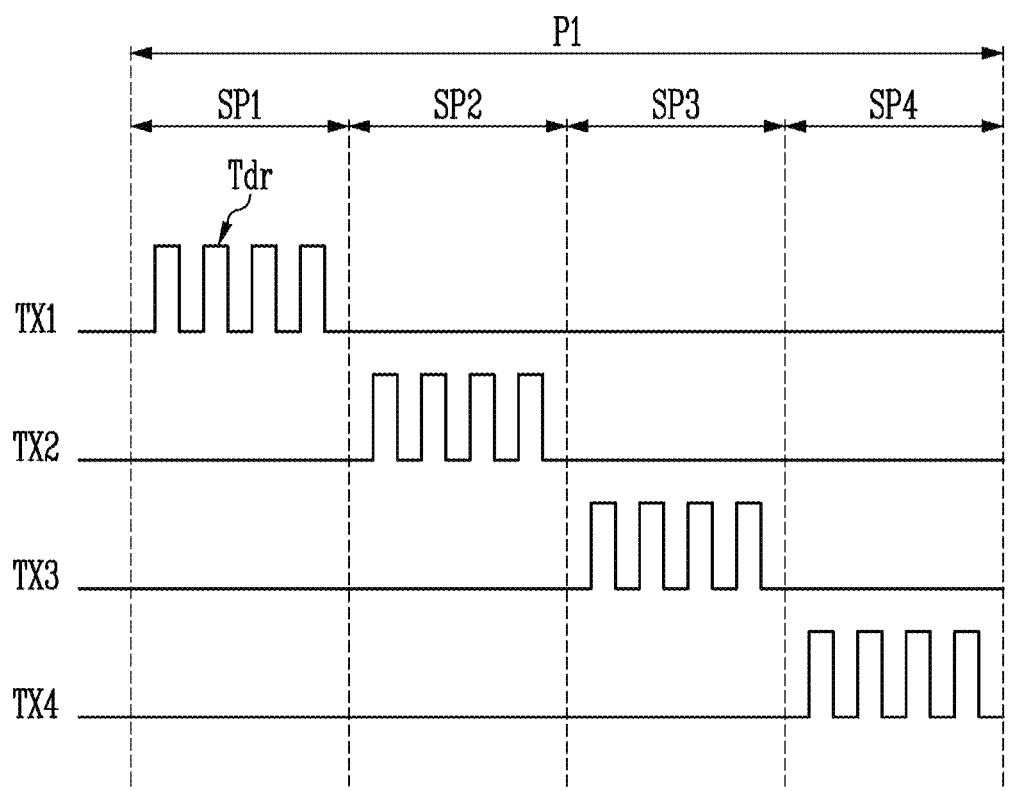
FIGS. 13 and 14 are diagrams illustrating an embodiment of a first touch signal supplied to a first touch area.
Figure 14:
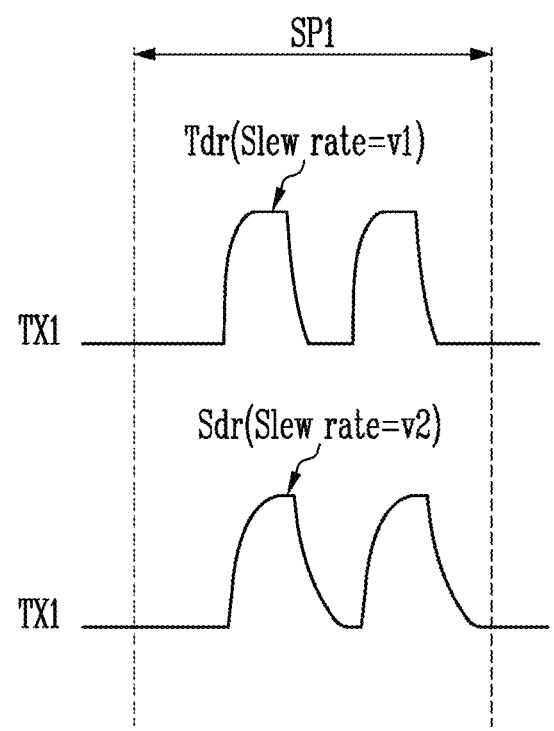

FIGS. 13 and 14 are diagrams illustrating an embodiment of a first touch signal supplied to the first touch area.

Referring to FIG. 13, a first driving signal Tdr which the touch controller 225 supplies to first sensors TX1 to TX4 included in the first touch area is illustrated. When the first sensors TX1 to TX4 are sequentially driven, a period P1 may include a plurality of sub-periods SP1 to SP4 in which the first driving signal Tdr is supplied to each of the first sensors TX1 to TX4.

When the signal generator 212 shown in FIGS. 5, 7, and 11 generates a mode control signal MCS, based on the first display area set in a current frame, the touch controller 225 may supply the first driving signal Tdr to the first touch area during a next frame after the current frame.

A number of pulses of the first driving signal Tdr supplied to the first touch area may be greater than a number of pulses of the driving signal Sdr shown in FIG. 4. The driving signal Sdr shown in FIG. 4 may be a second touch signal supplied to the second touch area.

In an embodiment, the number of pulses of the first driving signal Tdr may be in proportion to a range of the first display area. For example, when the whole of the display unit is set as the first display area, a number of pulses of the first driving signal Tdr may be greater than a number of pulses of the first driving signal Tdr when a half of the display unit is set as the first display area.

When comparing the first driving signal Tdr supplied to the first touch area, which is shown in FIG. 13, with the driving signal Sdr shown in FIG. 4, the number of pulses of the first driving signal Tdr may be greater than the number of pulses of the driving signal Sdr. Accordingly, a touch sensitivity of the first touch area may be higher than a touch sensitivity of the second touch area.

Referring to FIG. 14, an example of the first driving signal Tdr which the touch controller 225 supplies to a first sensor TX1 during a first sub-period SP1 is illustrated.

A slew rate of the first driving signal Tdr supplied to the first touch area is a first value v1. A slew rate of the driving signal Sdr supplied to the second touch area is a second value V2. In an embodiment, the first value v1 is greater than the second value v2.

In an embodiment, the first value v1 of the first driving signal Tdr may be in proportion to the range of the first display area. For example, a first value v1 of the first driving signal Tdr when the whole of the display unit is set as the first display area may be greater than a first value v1 of the first driving signal Tdr when the half of the display unit is set as the first display area.

When the slew rate of the first driving signal Tdr supplied to the first touch area is greater than the slew rate of the driving signal Sdr supplied to the second touch area, the touch sensitivity of the first touch area may be higher than the touch sensitivity of the second touch area.

In the display device in accordance with the present disclosure, since the display device sets touch areas, based on a signal including information on display areas, time required to set the touch areas can be decreased, and power consumption for setting the touch areas can be reduced.

Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
   a display driver configured to display an image on a display panel of the display device, and generate a mode control signal indicating whether the display panel includes at least one of a first display area and a second display area; and
   a sensor driver configured to set a touch sensitivity of a first touch area of the display device corresponding to the first display area and a touch sensitivity of a second touch area of the display device corresponding to the second display area to be different from each other, based on the mode control signal,
   wherein a viewing angle of the first display area is smaller than a viewing angle of the second display area.

2. The display device of claim 1, wherein the display driver outputs the mode control signal to the sensor driver for each cycle of a vertical synchronization signal.

3. The display device of claim 1, wherein, when the display panel includes the first display area, the mode control signal includes at least one pulse.

4. The display device of claim 1, wherein the sensor driver comprises:
- a first logic circuit configured to output an enable signal when a voltage level of the mode control signal is changed;
- a second logic circuit configured to determine the first display area, based on the mode control signal in response to receipt of the enable signal, and generate a first touch control signal indicating the first display area; and
- a touch controller configured to determine the first touch area, based on the first touch control signal, and supply a first driving signal to the first touch area.

5. The display device of claim 4, wherein the second logic circuit determines a range of the first display area according to a width of a first pulse of the mode control signal.

6. The display device of claim 4, wherein the second logic circuit determines a range of the first display area according to a number of pulses included in the mode control signal.

7. The display device of claim 4, wherein the first logic circuit outputs a second touch control signal when the voltage level of the mode control signal is maintained, and wherein the touch controller supplies a second driving signal to a sensor of the display device when the touch controller receives the second touch control signal.

8. The display device of claim 7, wherein a number of pulses included in the first driving signal is greater than a number of pulses included in the second driving signal.

9. The display device of claim 7, wherein a slew rate of the first driving signal is higher than a slew rate of the second driving signal.

10. The display device of claim 1, wherein the touch sensitivity of the first touch area is higher than the touch sensitivity of the second touch area.

11. A display device comprising:
- a display driver configured to display an image on a display panel of the display device, generate a mode control signal indicating whether the display panel includes at least one of a first display area and a second display area, and generate an encoding signal by encoding a vertical synchronization signal and the mode control signal; and
- a sensor driver configured to set a touch sensitivity of a first touch area of the display device corresponding to the first display area and a touch sensitivity of a second touch area of the display device corresponding to the second display area to be different from each other, based on the encoding signal,
- wherein the sensor driver determines a range of the first display area according to a width of a first pulse of the encoding signal.

12. The display device of claim 11, wherein a viewing angle of the first display area is smaller than a viewing angle of the second display area.

13. The display device of claim 11, wherein the display driver comprises:
- a signal generator configured to generate the mode control signal including a number of pulses, which corresponds to the range of the first display area, when the display panel includes the first display area; and
- an encoder configured to generate the encoding signal by encoding the mode control signal and the vertical synchronization signal.

14. The display device of claim 11, wherein the display driver comprises:
- a signal generator configured to output, as the mode control signal, a pulse signal having a first duration during a first period when the display panel includes the first display area, and output a pulse signal having a second duration different from the first duration during a second period after the first period; and
- an encoder configured to generate the encoding signal by encoding the mode control signal and the vertical synchronization signal.

15. The display device of claim 14, wherein the signal generator controls pulses included in the mode control signal during the second period according to the range of the first display area.

16. A display device comprising:
- a display driver configured to display an image on a display panel, generate a mode control signal indicating whether the display panel includes at least one of a first display area and a second display area, and generate an encoding signal by encoding a horizontal synchronization signal and the mode control signal; and
- a sensor driver configured to set a touch sensitivity of a first touch area of the display device corresponding to the first display area and a touch sensitivity of a second touch area of the display device to be different from each other, based on the encoding signal,
- wherein the display driver comprises:
- a signal generator configured to output a pulse signal as the mode control signal during a control period in a period of a frame when the display panel includes the first display area; and
- an encoder configured to generate the encoding signal by encoding the mode control signal and the horizontal synchronization signal.

17. The display device of claim 16, wherein a viewing angle of the first display area is smaller than a viewing angle of the second display area.

* * * * *